Patented Apr. 14, 1925.

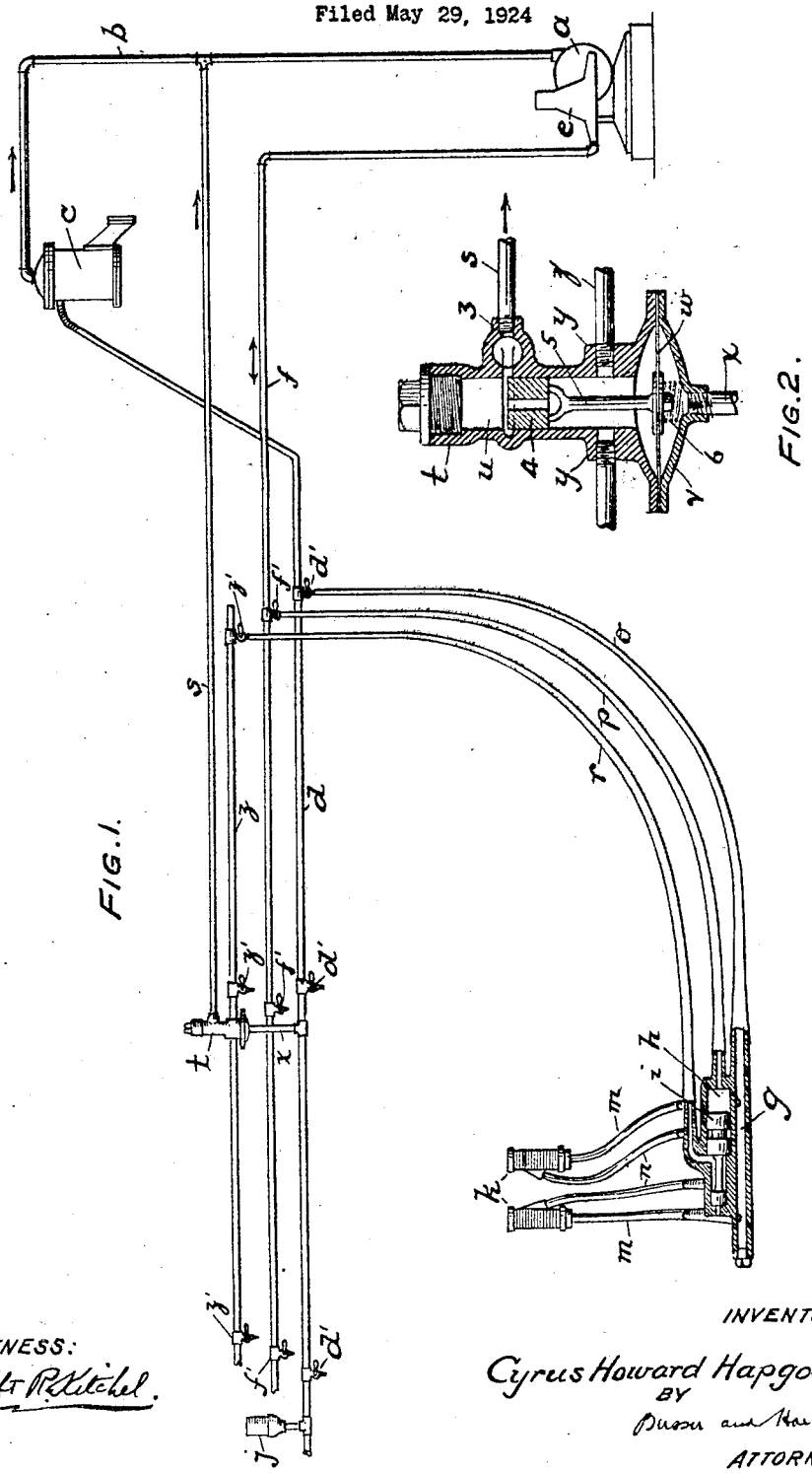

1,533,187

UNITED STATES PATENT OFFICE.

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY.

MILKING MACHINE.

Application filed May 29, 1924. Serial No. 716,548.

*To all whom it may concern:*

Be it known that I, CYRUS HOWARD HAPGOOD, a citizen of the United States, residing at Nutley, county of Essex, and State of New Jersey, have invented a new and useful Improvement in Milking Machines, of which the following is a full, clear, and exact description, reference being had to the accompanying drawings, which form a part of this specification.

A known efficient type of releaser milking machine comprises a milk pipe line leading to a releaser, a vacuum pipe connecting the releaser with a vacuum pump, and a pneumatic pulsation pipe line. The pipe lines are equipped with cocks along their length, to which are connectible milker units each comprising a claw having a milk chamber and an udder pulsator valve, and double chamber teat cups. The inner or teat chambers of the cups connect with the milk chamber of the claw, from which extends a milk pipe that is connectible with the milk pipe line. The outer or pulsation chambers of the cups connect with the valve chamber of the claw, from which extends an air pipe connected with the pipe that is connectible with the milk pipe line. The valve chamber of the claw is so connectible with the pulsation pipe line that the valve therein reciprocates in response to pneumatic pulsations transmitted through such line. The valve, in its reciprocations, connects each pulsation chamber of a teat cup alternately with atmosphere and with the said air pipe communicating, through said milk pipe, with the milk pipe line.

The above mode of operation involves the exhaustion of air from the outer teat cup chambers into the milk pipe line. This often leads to contamination of the milk. For example, when the teat cups are washed, the precaution is not always taken to remove the flexible annular diaphragm, or "inflation", that divides the teat cup into its two chambers, and the more or less dirty wash water enters the pulsation chambers. In the subsequent operation of the machine, this wash water is necessarily drawn into the milk and sometimes imparts a disagreeable flavor to the milk and may, in some instances, seriously contaminate it.

In the pail system of milking, the main pipe line is purely an air line operating to exhaust air from the pail and does not receive milk. In such a system, contamination of the milk arising from exhaustion of air from the pulsation chambers of the teat cups is avoided by exhausting such air into the main vacuum pipe line, as disclosed in the Leitch Patent No. 1,394,433, October 18, 1921. But where, as in the releaser system, the vacuum pipe line is also a milk line, contamination occurs, as above explained.

It has been sought to avoid this contamination by providing a third pipe line and connecting it with the vacuum pump so that it will function solely as an air pipe, and providing for exhaust of air from the inflation chambers of the teat cups into this line. This does avoid contamination, but it gives rise to other more serious difficulties, which may be explained as follows:

In the releaser system of milking, it is usually necessary that the releaser should be positioned at a substantially higher level than the milk pipe line, in order to carry this pipe line over passageways or to deliver milk at a height sufficient to flow over milk coolers before reaching the usual receptacles. Inasmuch as a large volume of milk must be drawn through the milk pipe line and lifted into the releaser, it is obvious that the vacuum in the milk pipe line is much weaker than at the pump. It is also necessary to lift the milk from the teat cups into the milk pipe line. The vacuum at the teat cups, is therefore, somewhat lower than in the milk pipe line. For example, there may be twenty inches of vacuum at the pump, fifteen inches in the milk pipe line and fourteen inches at the teat cups.

Now, if provision is made for the exhaust of air from the inflation chambers of the teat cups into a special vacuum pipe line, it is obvious that the vacuum in the outer teat cup chambers (when they are connected with vacuum) will be approximately that at the pump, as the vacuum has almost no work to perform. This results in a highly unbalanced vacuum in the two teat cup chambers. The vacuum in the outer chambers may be five or six inches higher than in the inner chambers, causing a highly injurious action on the teats. Indeed, the necessity of approximately balancing the vacuum in the two teat cup chambers has been long well recognized.

It has been attempted to overcome this difficulty by applying a pressure reducing valve to the supplementary vacuum pipe line. Thereby the vacuum in this pipe line can be lowered as desired, but it does not solve the problem, for several reasons. In the first place, in different installations the releaser inlet is placed at different heights above the floor line, which creates wide variations in the absolute pressure drop between the vacuum pump and the milk pipe line. This necessitates a careful adjustment of the pressure regulation valve to adapt it to different installations. The installers of the milking machine cannot be depended on to effect this adjustment with any approach to accuracy, while, even if the valve is efficiently adjusted, there is nothing to prevent the user from tampering with the valve and effecting such different adjustment as will seriously unbalance the vacuum. Unfortunately, the evils of an unbalanced vacuum do not reveal themselves until after the teats of the cows are seriously injured and even then the cause may be unsuspected by the user.

In the next place, the difference between the degrees of vacuum at the pump and in the pipe line and at the teat cups is not a constant factor in the same machine. Substantial variations in the volume of milk flow, and other factors, cause the vacuum at the teat cups to vary notwithstanding a constant degree of vacuum at the pump.

An efficient remedy for the described condition of unbalanced vacuum at the teat cup involves the provision of means whereby the vacuum in the outer teat cup chambers will automatically balance, or nearly balance, the vacuum in the inner teat cup chambers, regardless of the degree to which the latter vacuum may vary in different installations or at different times in the same installation.

I have accomplished this object by means one specific embodiment of which is illustrated in the accompanying drawings, in which—

Fig. 1 is a diagram of a releaser milker with my invention applied thereto.

Fig. 2 is a longitudinal section of the vacuum balancing valve and its pneumatic operating means.

From a vacuum pump $a$ extends an air pipe $b$ to a releaser $c$. Beyond the releaser is the milk pipe line $d$. $e$ is a master pulsator valve operable by the vacuum pump to connect the pneumatic pulsation pipe line $f$ alternately with pressure (atmosphere) and vacuum.

The milk pipe line is provided with a vacuum control valve $j$ and cocks $d'$. The pulsation pipe line is provided with cocks $f'$. To these cocks are adapted to be connected milker units.

Each milker unit (which is shown on a scale enlarged relative to the entire apparatus) comprises a claw composed of a milk chamber $q$ and a valve chamber $h$ containing an udder pulsator valve $i$; also four teat cups $k$ (only two are shown) whose inner chambers are connected by tubes $m$, $m$ with the milk chamber $g$ and whose outer chambers are connected by tubes $n$, $n$ with the valve chamber $h$. From the milk chamber $g$ extends a pipe $o$ adapted for connection with any of the cocks $d'$ on the milk pipe line $d$. From the valve chamber $h$ extends a pipe $p$ adapted for connection with any of the cocks $f'$ on the pulsation pipe line $f$. From the valve chamber extends a pipe $r$ which is usually (but not in my invention) connected with the pipe $o$ near the end thereof adapted for connection with the milk pipe line $d$.

In operation, milk is drawn from the teats through the inner chambers of the teat cups, tubes $m$, milk chamber $g$, pipe $o$ and milk pipe line $d$ to releaser $c$. Valve $i$ is reciprocated by pulsations transmitted thereto through pipe line $f$ and pipe $p$. The reciprocation of valve $i$ operates to connect each tube $n$ (leading from an outer teat cup chamber) alternately with pressure (atmosphere) and with pipe $r$, which must be in some manner connected with vacuum.

In my invention, I provide a third pipe line $s$, which is connected with the vacuum pump.

$t$ is a casing provided with a tubular valve chamber $u$ enlarged and dish-shaped at one end to receive a complementary dish-shaped end closure $v$, thereby forming a diaphragm chamber across which extends a diaphragm $w$. The end head $v$ is provided with a threaded orifice adapted to receive a pipe $x$ connected with the milk pipe line $d$.

The valve chamber $u$ is provided with aligning threaded orifices $y$ adapting the casing to be inserted in a fourth (air) pipe line $z$, which extends along the pipe lines $d$ and $f$ and is provided with cocks $z'$ any of which are adapted for connection with the pipe $r$ of a milker unit.

The valve chamber $u$ is also provided with a port 3 having a threaded orifice adapted to connect with the end of the special vacuum pipe line $s$.

Within the valve chamber $u$ is an axially ported valve 4 having a stem 5 attached to the diaphragm $w$. Normally the valve 4 is so positioned as to partly open port 3, thereby affording communication between the special vacuum pipe $s$ and the air pipe line $z$, which, as above stated, connects with the outer or pulsation chambers of the teat cups.

With unrestricted communication between pipes $s$ and $z$, an objectionably high vacuum would be created in the pipe $z$ and in the outer teat cup chambers but, as shown, valve 4 partly throttles port 3, thereby reducing the vacuum in pipe $z$; the valve being held in position to balance the vacuum between pipe $z$ and pipe $x$ (connected with milk pipe $d$) by means of the diaphragm $w$.

In case the absolute pressure in milk pipe line $d$ should rise above the pressure in pipe line $z$, diaphragm $w$ will operate to slide valve into position to further throttle, or temporarily entirely close, port 3, thereby causing the absolute pressure in pipe line $z$ to rise until the pressures on opposite sides of the diaphragm are equalized. In case the absolute pressure in pipe line $z$ should rise above the pressure in milk pipe line $d$, diaphragm $w$ will operate to slide the valve into position to further, or temporarily wholly, open port 3, thereby causing the pressure in pipe line $z$ to drop until the pressures on opposite sides of the diaphragm $w$ are equalized.

There is, as hereinbefore explained, a slight, and usually insubstantial, difference in the degrees of vacuum at the teat cups and in the milk pipe line; but this difference is not so great as to create any serious pull on the teat and thereby inflict any substantial injury thereto. In my invention, so far as I have described it, this difference is not rectified; but if it is desired to do so, means may be provided, such as a light spring 6 confined between the diaphragm $w$ and the end head $v$, which, if the absolute pressures in pipes $z$ and $d$ should be equal, would move diaphragm $w$ into position to further throttle port 3 and cause the vacuum in pipe $z$ to fall somewhat, thereby exactly balancing the vacuum in the inner teat cup chambers. In other words, the absolute pressures on diaphragm $w$ are normally just sufficiently unbalanced to exactly balance the vacuum on opposite sides of the inflation in the teat cup. The spring 6 may be omitted, however, if so fine an adjustment is not deemed advisable.

By means of the foregoing construction, means are provided for substantially or precisely balancing the vacuum in the teat cups, which means is applicable to any installation without adjustment and operates automatically, in any installation, to effect the desired balancing regardless of variations in the vacuum between the vacuum pump and the locus of milking.

Having now fully described my invention, what I claim and desire to protect by Letters Patent is:

1. In a milking machine, in combination, a source of suction, a milk pipe line and a special vacuum pipe line connected with the source of suction, a milking unit comprising double chamber teat cups whose inner chambers are connectible with the milk pipe line and a pulsator valve adapted to connect the outer teat cup chambers alternately with pressure fluid and with said special vacuum pipe line, and means interposed between the outer teat cup chambers and the special vacuum pipe line to reduce the effective vacuum in the teat cups below that in the special vacuum pipe line and substantially proportionately to the reduction of the vacuum in the milk pipe line below that at the source of suction.

2. In a milking machine, in combination, a source of suction, a milk pipe line and a special vacuum pipe line connected therewith, an air pipe line, a milking unit comprising double chamber teat cups whose inner chambers are adapted for connection with the milk pipe line and a pulsator valve adapted to connect the outer teat cup chambers alternately with pressure fluid and with said air pipe line, and means, including a connection between the special vacuum pipe line and the air pipe line, adapted to create in the air pipe line a partial vacuum and maintain it at a substantially constant ratio to the partial vacuum in the milk pipe line.

3. In a milking machine, in combination, a source of suction, a milk pipe line and a special vacuum pipe line connected therewith, an air pipe line, a milking unit comprising double chamber teat cups whose inner chambers are adapted for connection with the milk pipe line and a pulsator valve adapted to connect the outer teat cup chambers alternately with pressure fluid and with said air pipe line, means affording communication between the special vacuum pipe line and the air pipe line, and means governed by the absolute pressures in the air pipe line and the milk pipe line to throttle said communication and maintain said pressures approximately balanced.

4. In a milking machine, in combination, a source of suction, a milk pipe line and a special vacuum pipe line connected therewith, an air pipe line, a milking unit comprising double chamber teat cups whose inner chambers are adapted for connection with the milk pipe line and a pulsator valve adapted to connect the outer teat cup chambers alternately with pressure fluid and with said air pipe line, means affording communication between the vacuum pipe line and the air pipe line, a diaphragm opposite faces of which are open respectively to the milk pipe line and the air pipe line, and a valve operable by the diaphragm and adapted to control said communication.

5. In a milking machine, in combination, a source of suction, a milk pipe line and a special vacuum pipe line connected therewith, an air pipe line, a milking unit comprising double chamber teat cups whose inner chambers are adapted for connection with the milk pipe line and a pulsator valve adapted to connect the outer teat cup chambers alternately with pressure fluid and with said air pipe line, a casing forming a chamber having a cylindrical bore and an enlarged chamber at one end, a diaphragm in said enlarged chamber, means affording communication between the end head of said enlarged chamber and the milk pipe line, the bore of said casing having ports communicating respectively with the vacuum pipe line and the air pipe line and a valve slidable in said bore and connected with said diaphragm and movable thereby to throttle the port communicating with the vacuum pipe line.

6. In a milking machine, the combination with a source of suction; a releaser connected therewith; a milk pipe line connected with the releaser; a pneumatic pulsation pipe line; a milking unit comprising teat cups provided with inner teat chambers and outer pulsation chambers, a milk pipe communicating with the teat chambers and adapted for connection with the milk pipe line, a pulsation pipe adapted for connection with the pulsation pipe line, a third pipe, and a valve operable by pulsations transmitted through the pulsation pipe to connect the outer teat cup chambers alternately with atmosphere and with said third pipe; of a special pipe line connected with suction, a second special pipe line with which said third pipe of the milking unit is adapted to be connected, means affording communication between the two special pipe lines, a diaphragm opposite sides of which communicate respectively with the second special pipe line and the milk pipe line, and a valve operable by said diaphragm to variably throttle the communication between the two special pipe lines.

7. In a milking machine, in combination, a source of suction, a milk pipe line and a special vacuum pipe line connected therewith, an air pipe line, a milking unit comprising double chamber teat cups whose inner chambers are adapted for connection with the milk pipe line and a pulsator valve adapted to connect the outer teat cup chambers alternately with pressure fluid and with said air pipe line, means affording communication between the vacuum pipe line and the air pipe line, a diaphragm opposite faces of which are open respectively to the milk pipe line and the air pipe line, a valve operable by the diaphragm and adapted to control said communication, and a spring acting upon the diaphragm and arranged to supplement the absolute pressure in the milk pipe line and operating, with the diaphragm and valve, to reduce the vacuum in the air pipe line somewhat below that in the milk pipe line.

In testimony of which invention, I have hereunto set my hand, at New York, on this 27th day of May, 1924.

CYRUS HOWARD HAPGOOD.

Witnesses:
R. R. WARREN,
JOHN H. LISLE.